(12) United States Patent
Yao (10) Patent No.: US 8,723,428 B2
(45) Date of Patent: May 13, 2014

(54) LED POWER SOURCE WITH OVER-VOLTAGE PROTECTION

(75) Inventor: Gang Yao, Mayfield Heights, OH (US)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 13/299,020

(22) Filed: Nov. 17, 2011

(65) Prior Publication Data

US 2013/0127358 A1 May 23, 2013

(51) Int. Cl.
*H05B 37/02* (2006.01)
*H05B 33/08* (2006.01)

(52) U.S. Cl.
CPC .................................. *H05B 33/0815* (2013.01)
USPC ............................ 315/177; 315/219; 315/307

(58) Field of Classification Search
CPC ........................... H05B 33/0815; H05B 33/089
USPC ........ 315/177, 209 R, 219, 291, 307; 363/16, 363/17, 89
See application file for complete search history.

(56) References Cited

U.S. PATENT DOCUMENTS

| | | | | |
|---|---|---|---|---|
| 4,811,185 A | * | 3/1989 | Cook et al. ....................... | 363/17 |
| 5,208,738 A | * | 5/1993 | Jain .................................. | 363/17 |
| 5,870,291 A | | 2/1999 | Farrington et al. | |
| 6,344,979 B1 | | 2/2002 | Huang et al. | |
| 6,366,474 B1 | * | 4/2002 | Gucyski .......................... | 363/20 |
| 6,400,584 B1 | | 6/2002 | Sabate et al. | |
| 6,496,387 B2 | * | 12/2002 | Halberstadt ..................... | 363/17 |
| 6,541,925 B1 | * | 4/2003 | Chang et al. .................... | 315/291 |
| 7,733,669 B2 | * | 6/2010 | Jiao et al. ......................... | 363/16 |
| 7,973,494 B2 | | 7/2011 | Yao et al. | |
| 2001/0036090 A1 | * | 11/2001 | Halberstadt ................ | 363/21.02 |
| 2006/0170399 A1 | | 8/2006 | Griffin | |
| 2011/0038181 A1 | * | 2/2011 | Yan et al. ......................... | 363/17 |
| 2011/0273911 A1 | * | 11/2011 | Torrico-Bascop et al. | 363/21.02 |
| 2012/0025720 A1 | | 2/2012 | Chen et al. | |

FOREIGN PATENT DOCUMENTS

CN          101938222 A          1/2011

OTHER PUBLICATIONS

PCT Search Report and Written Opinion dated Jan. 28, 2013 from corresponding Application No. PCT/US2012/059533.

* cited by examiner

*Primary Examiner* — Don Le
(74) *Attorney, Agent, or Firm* — Peter T. DiMauro; GE Global Patent Operation (57) ABSTRACT

A resonant DC-DC converter used to drive an LED array includes a half-bridge converter configured to receive DC input power and produce a square wave voltage. A resonant tank circuit that includes an inductive element, a first resonance capacitor, and a second resonance capacitor, is coupled to the half-bridge converter to receive the square wave voltage such that a generally sinusoidal AC voltage is produced across the second resonance capacitor. An output transformer with a primary winding and one or more secondary windings, is coupled in parallel to the second resonance capacitor, and a clipping circuit is coupled to the primary winding such that the voltage across the primary winding does not substantially exceed the voltage of the DC input power. An output rectifier is coupled to the one or more secondary windings of the output transformer and is configured to produce a generally DC output voltage.

20 Claims, 10 Drawing Sheets

LED POWER SOURCE WITH OVER-VOLTAGE PROTECTION

BACKGROUND

1. Field of the Invention

The aspects of the present disclosure relate generally to power supplies for electroluminescent devices and in particular to resonant power converters used to drive light emitting diode arrays.

2. Description of Related Art

Light Emitting Diode (LED) arrays, in which multiple LEDs are formed into an array and powered as a unit, are gaining popularity in lighting and signaling applications. LED arrays are typically connected to a direct current (DC) power source where the amount of applied current controls the brightness of emitted light. Switched mode power supplies are often used to provide power for LED arrays and other appliances requiring low level direct current (DC) power. Switched mode power supplies generally relate to a class of voltage regulation apparatus where input DC power is chopped by a switching circuit and fed into an energy storage device, usually an inductor. Energy from the chopped DC power is alternately stored into a magnetic field and discharged therefrom into a secondary circuit containing rectification and filtering to produce a conditioned DC output voltage. A controller is typically used to monitor conditions of the output power and adjust the switching circuit accordingly to provide regulation of the output. Switched mode supplies fall into two categories. Supplies that convert DC to alternating current (AC) are known as 'inverters' and supplies that convert DC to DC are known as 'converters'. A converter is typically an inverter followed by a rectifier.

Figure 1:
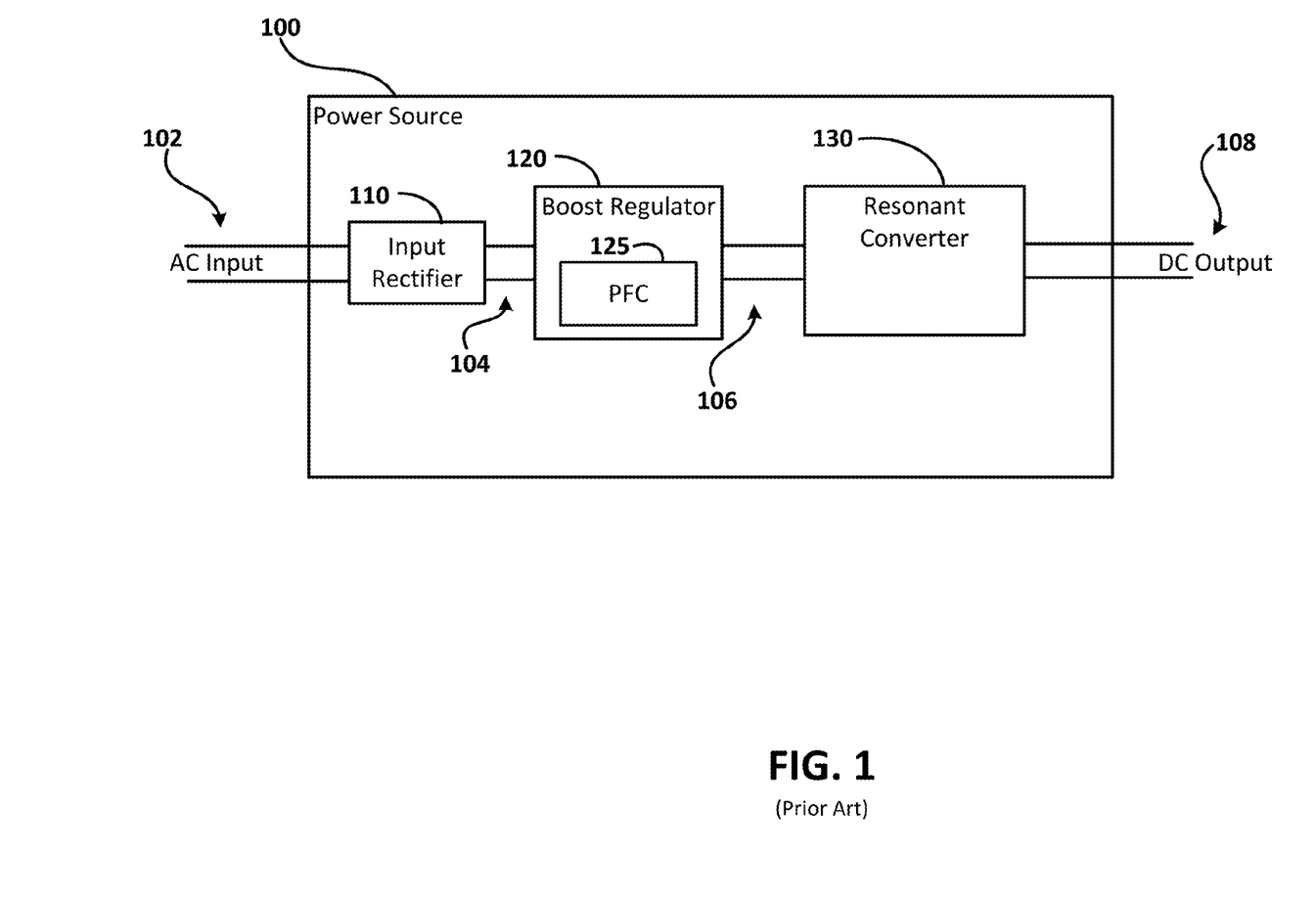
FIG. 1 illustrates a block diagram of an exemplary prior art switched mode power source for a LED array.

A block diagram of a typical switched mode power source used to supply LED arrays is shown in FIG. 1. The switched mode power source 100 receives AC input power 102 which may be supplied from a local mains power source such as for example the 120 volt, 60 Hertz power available in the United States, 50 Hertz 230 volt power available in many European countries, or other suitable AC power sources. An input rectifier 110 is used to convert the AC input power 102 to DC power 104. Input rectifier 110 may be a simple diode bridge or other suitable active or passive rectification device capable of converting AC to DC. It is preferable to have rectifier 100 provide full wave rectification of the input AC power, however in certain embodiments the use of half wave rectification can be advantageous. The rectified DC power 104 created by the input rectifier 110 is further conditioned by a boost regulator 120. The boost regulator 120, also known as a step-up regulator, is a type of DC-DC power converter with a DC output voltage 106 greater than its DC input voltage 104. The boost regulator 120 is typically a switched mode converter, which includes various switching devices and control circuitry (not shown) to regulate the voltage of the rectified DC power 104 and produce a conditioned DC voltage 106. In some embodiments, such as the embodiment shown in FIG. 1, the converter 120 includes a power factor correction (PFC) component 125 to improve the power factor of the power source 100. PFC improves the overall efficiency of the supply 100 by compensating for harmonics and phase shifting caused by the input rectifier 110. The regulator 120 provides conditioned and voltage adjusted DC power 106 suitable for input to a resonant converter 130. Resonant converters 130 can achieve greater efficiency through the use of input power 106 that is substantially higher than the local mains voltage, often in the range of 450 volts. Boost regulator 120 is used to increase the mains voltage to the level needed by the resonant converter. In certain embodiments, the regulator 120 may be omitted, in which case the input rectifier 110, or other external DC source (not shown), will provide DC power 106 directly to the resonant converter 130.

Figure 2:
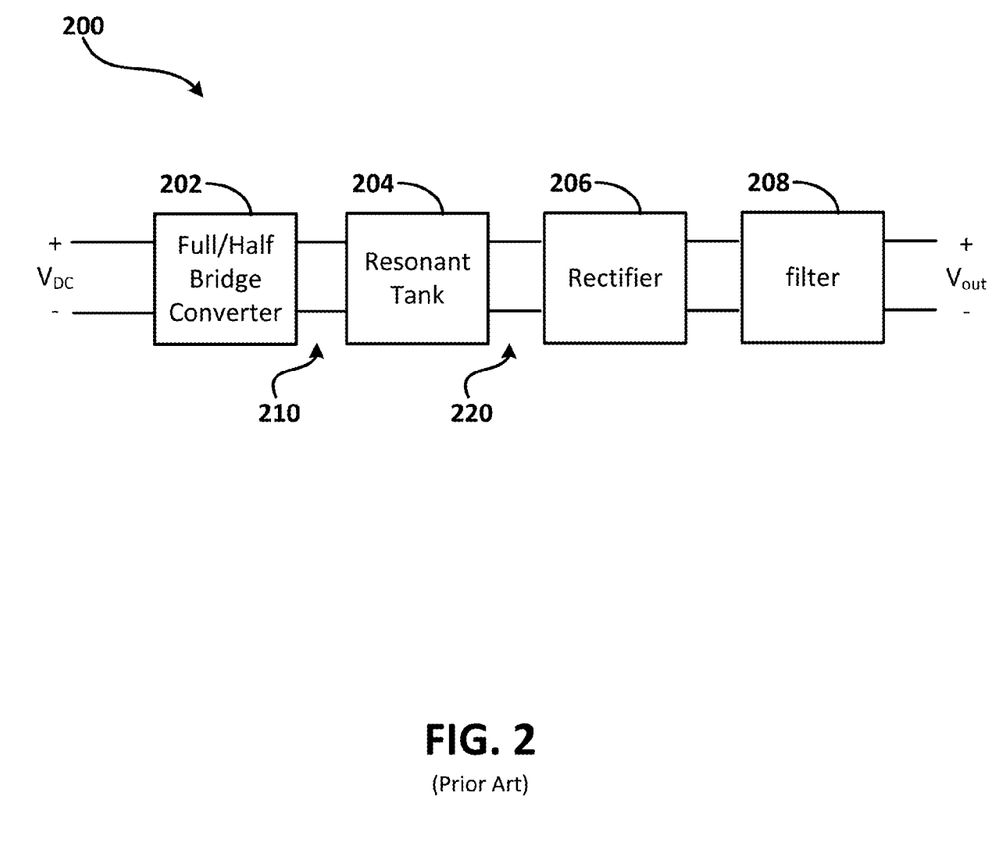
FIG. 2 illustrates a typical architecture for a prior art resonant DC-DC converter.

A resonant converter is a type of switched mode DC-DC power converter that uses a resonant tank circuit comprising a combination of inductive and capacitive components, for energy storage, rather than a single inductor as is used in other switched mode supplies such as a Boost Converter. FIG. 2 shows a block diagram depicting a typical architecture for a resonant converter 200 as is known in the art. Resonant converter architecture can be divided into four main sections: a full or half wave bridge converter 202; a resonant tank 204; a rectifier 206; and an output filter 208. Starting from the input side, the full or half bridge converter 202 comprises a set of switches that chop the input DC voltage ($V_{DC}$) to produce a square wave. A full-bridge converter 202 uses four switches to produces an AC square wave 210 with an amplitude of twice the input voltage $V_{DC}$, while a half-bridge converter 202 uses only two switches to produce a square wave 210 with an amplitude of $V_{DC}$ and a DC offset of $V_{DC}/2$. The switches in a bridge converter 202 are operated in complementary mode with a fixed duty cycle and some dead time. In a basic switched-mode power converter, such as the boost regulator 120 in FIG. 1, the output is typically controlled by adjusting the duty cycle of the bridge converter 202. Controlling the output by adjusting the duty cycle is known as Pulse Width Modulation control. However, in the case of resonant converters, control is achieved by adjusting the frequency of the bridge converter 202. Changing the frequency of the bridge converter changes the impedance of the resonant tank 204, thereby allowing control of power flowing to the output. The resonant tank 204 is made up of reactive components—capacitors and inductors—and can be arranged in several different configurations. A series LC resonant tank uses a resonant tank comprising an inductor connected in series with a capacitor, and has the resonant tank connected in series with the load. A parallel LC resonant tank also uses a resonant tank comprising an inductor in series with a capacitor. However the load is connected in parallel with the resonant capacitor. Another common configuration is the series-parallel LLC resonant tank, which has three energy storage components, a capacitor and two inductors, all connected in series (the 'series' portion of the 'series-parallel' designation), and the load is coupled in parallel with the second inductor (the 'parallel' portion). An LLC resonant tank circuit typically operates at high frequencies and can be highly efficient but has some difficulties when operating under no-load conditions. Various solutions to the no-load problems have been purposed, such as re-cycling the converter, but these solutions are difficult to control and reliability is a concern. The output 220 of the resonant tank 204 will have either a sinusoidal current or a sinusoidal voltage depending on the configuration of the resonant tank 204. A resonant inverter is created by combining a bridge converter 202 and a resonant tank 204 to convert a DC input voltage ($V_{DC}$) to a generally sinusoidal alternating current (AC) output voltage 220. To complete the DC-DC resonant converter 200, a rectifier 206 and an output filter 208 are added to the resonant inverter to rectify and smooth the AC voltage output 220 created by the resonant inverter, yielding a DC output voltage $V_{out}$.

Resonant DC-DC converters 200, of the type described above, are used to provide DC power to various types of electroluminescent devices, battery chargers, or other devices requiring low level DC power, and because of their high efficiency they are widely used in drivers for LED arrays. These devices often operate in offices and homes, as well as other locations where safety is a concern, so they typically need to be approved by rating institutions such as Underwriters Laboratories (UL). Low level DC power supplies, such as the supplies used by LED arrays, are known as class 2 supplies and are defined by Underwriters laboratories as having transformer isolation and producing less than 60 volts DC. Among other requirements, UL approval requires electrical isolation between the input and output, as well as over-voltage protection (OVP) to prevent the output voltage form exceeding the specified maximum values. The OVP circuitry needs to constrain the output voltage during both normal operation and fault conditions. Over-voltage protection circuits are typically added to the final stages of the converter 170, for example the rectifier 176 or filter 178, by including additional components such as a crowbar circuit or a clipping circuit. Alternatively, OVP may be added by adding or enhancing a feedback controller. In any case, the addition of OVP comes with additional costs, including increased manufacturing costs, functional limitations, and/or reduced reliability.

Accordingly, it would be desirable to provide a resonant DC-DC converter that resolves at least some of the problems identified above.

SUMMARY OF THE INVENTION

As described herein, the exemplary embodiments overcome one or more of the above or other disadvantages known in the art.

One aspect of the present disclosure relates to a resonant DC-DC converter used to drive an LED array. The resonant DC-DC converter includes a half-bridge converter configured to receive DC input power and produce a square wave voltage. A resonant tank circuit that includes an inductive element, a first resonance capacitor, and a second resonance capacitor, is coupled to the half-bridge converter to receive the square wave voltage such that a generally sinusoidal AC voltage is produced across the second resonance capacitor. An output transformer with a primary winding and one or more secondary windings, is coupled in parallel to the second resonance capacitor, and a clipping circuit is coupled to the primary winding such that the voltage across the primary winding does not substantially exceed the voltage of the DC input power. An output rectifier is coupled to the one or more secondary windings of the output transformer and is configured to produce a generally DC output voltage.

Another aspect of the present disclosure relates to a method for providing over-voltage protection in a resonant switch mode DC to DC converter. The method includes converting a DC input voltage to a square wave using a half-bridge converter. The square wave is converted to a generally sinusoidal AC bus voltage using a series-parallel LCC resonant tank circuit. The AC bus voltage is prevented from substantially exceeding the DC input voltage using a clamping circuit. An AC output voltage is created and electrically isolated from the AC bus voltage via an output transformer and the AC output voltage is converted to a DC output voltage using a full wave rectifier and an output filter.

Another aspect of the present disclosure relates to a power source for an LED array of one or more LEDs. The power source includes an input rectifier configured to receive an AC input power and produce an initial DC voltage, a boost regulator configured to convert the initial DC voltage to an intermediate DC voltage having a voltage higher than the initial DC voltage, and a half-bridge converter configured to receive DC input power and produce a square wave voltage. A resonant tank circuit that includes an inductive element, a first resonance capacitor, and a second resonance capacitor, is coupled to the half-bridge converter to receive the square wave voltage such that a generally sinusoidal AC voltage is produced across the second resonance capacitor. An output transformer with a primary winding and one or more secondary windings, is coupled in parallel to the second resonance capacitor, and a clipping circuit is coupled to the primary winding such that the voltage across the primary winding does not substantially exceed the voltage of the DC input power. An output rectifier is coupled to the one or more secondary windings of the output transformer and is configured to produce a generally DC output voltage.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

Figure 3:
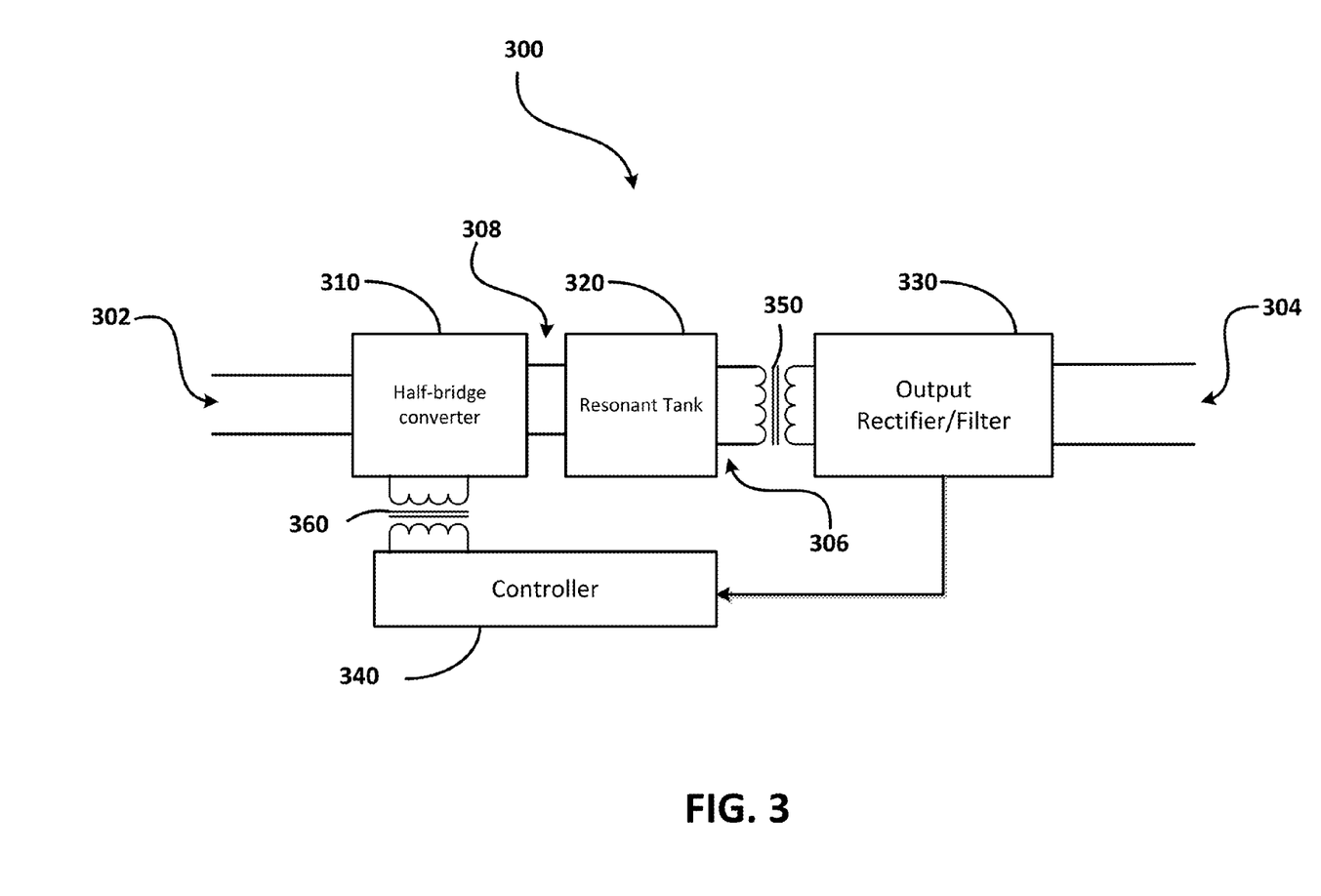
FIG. 3 illustrates a block diagram of an exemplary isolated resonant DC-DC converter incorporating aspects of the present disclosure.

Referring now to the drawings there can be seen in FIG. 3 a block diagram of an exemplary isolated resonant DC-DC converter 300 incorporating aspects of the disclosed embodiments. The resonant converter 300 can be used in a power source 100 as is shown in FIG. 1 for operating Light Emitting Diode arrays and other class 2 apparatus, as is generally described herein. The aspects of the disclosed embodiments are generally directed to a power source that includes a resonant converter capable of providing isolated DC-DC conversion and over-voltage protection.

The isolated DC-DC converter 300 includes a half-bridge converter 310 and a resonant tank coupled through an output transformer 350 to an output rectifier/filter 330. A controller 340 receives information from the output rectifier 330 and is coupled to the self-oscillating inverter 310 through a feedback transformer 360 to provide closed loop control of the converter 300. The output transformer 350 and the feedback transformer 360 work together to provide electrical isolation between the input DC power 302 and the output DC power 304. The half-bridge converter 310 converts the input DC power 302 to a square wave 308 that excites the resonant tank 320 to produce an intermediate AC voltage 306. The AC voltage 306 is passed through the output transformer 350 to the output rectifier/filter 330 where it is rectified and filtered to produce the DC output 304. The controller 340 selectively monitors conditions of the output rectifier/filter 330 and adjusts the frequency of half-bridge converter 310 to maintain conditions of the DC output 304 within desired operating levels.

Figure 4:
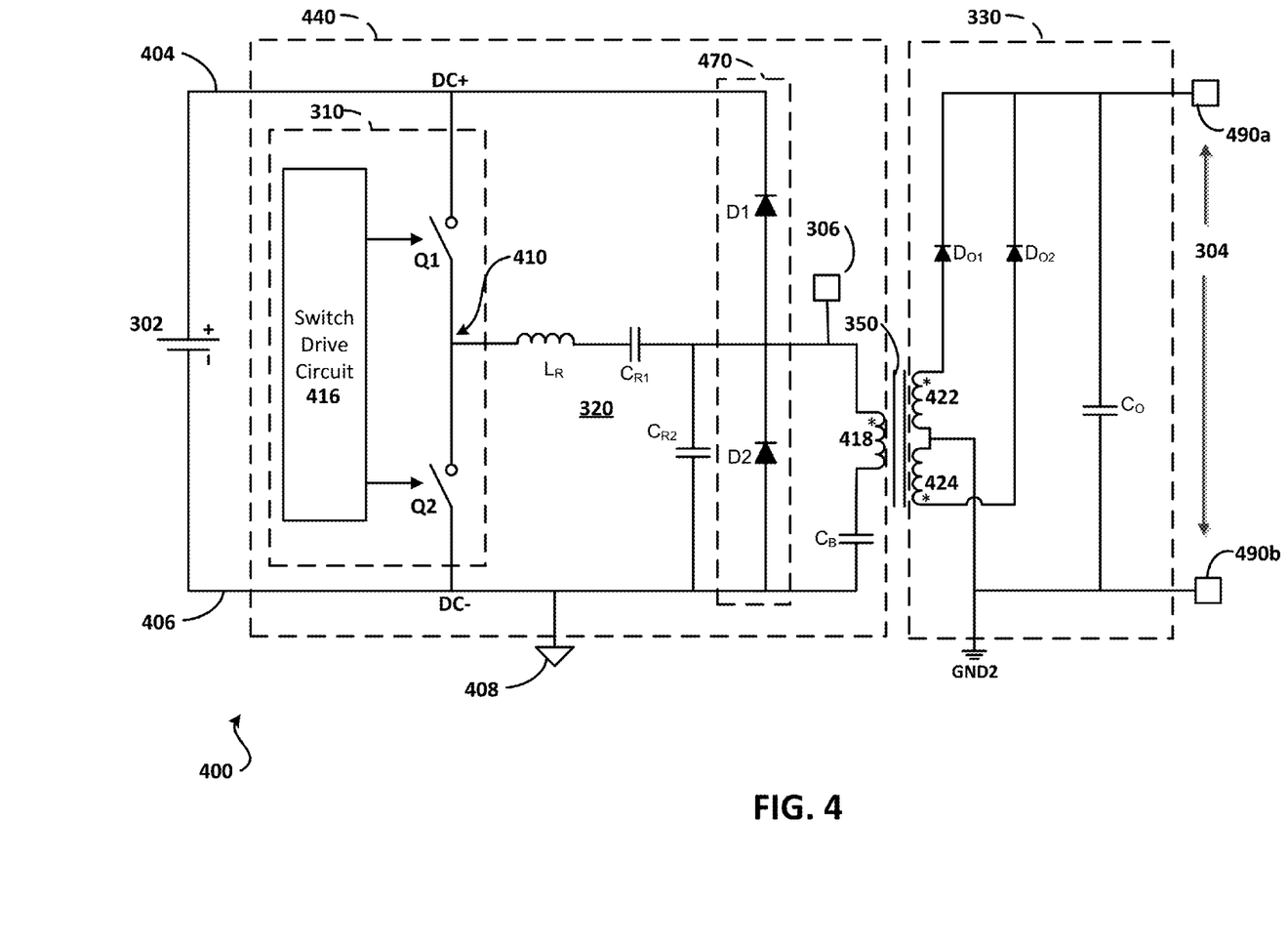
FIG. 4 illustrates a diagram of an exemplary circuit topology for an isolated DC-DC converter incorporating aspects of the present disclosure.

Referring now to FIG. 4, a schematic diagram is shown that illustrates an exemplary circuit topology for an isolated resonant DC-DC converter 400 suitable for use in place of the isolated DC-DC converter 130 in the prior art supply 100 of FIG. 1. The isolated DC-DC converter 400 can also be advantageously employed in any system here isolated DC-DC conversion with over-voltage protection ("OVP") is required. The isolated DC-DC converter 400 contains a new topology for a resonant converter that provides significant advantages over prior art DC-DC converters such as the prior art converter 130 shown in FIG. 1 or the resonant converter 200 shown in FIG. 2. Among these advantages is the capability of providing inherent over-voltage protection. The inherent OVP provided by circuit topology 400 can satisfy regulatory OVP requirements thus obviating the need for additional OVP circuitry as is typically needed in prior art DC-DC converters 130, 200. Elimination of additional OVP circuitry provides many advantages including reduced cost and improved reliability.

The isolated DC-DC inverter 400 receives DC input power 302 onto two power rails: a supply rail 404 and a return rail 406. The supply rail supplies current, i.e. removes electrons from the inverter 400 and the return rail provides a return path for the current, i.e. the return rail supplies electrons to the inverter 400. In the exemplary embodiment shown in FIG. 2 the return rail 406 is tied to a first circuit common 408, however in alternate embodiments other circuit common and grounding configurations may be used. DC input power 302 may be provided by a DC source such as for example DC power 106 from the regulator 120 of FIG. 1, or alternatively any suitable DC source may be employed. Within the DC-DC converter 400 is a half-bridge converter 310 that receives DC power from the supply rail 404 and return rail 406 and produces a half-bridge converter output voltage at circuit node 410. The half-wave bridge converter 310 produces a square wave at node 410 of fixed duty cycle with an amplitude equal to the input voltage 302 and with a DC bias equal to one-half of the input voltage 302. In alternate embodiments, a full-bridge converter may be used in place of the half-bridge converter 310. The converter 310 includes a pair of switching devices Q1 and Q2, which in one exemplary embodiment are n-channel metal-oxide-semiconductor field-effect transistors (MOSFET). Alternatively the switches Q1 and Q2 may be Bipolar Junction Transistors (BJT), Insulated Gate Bipolar Junction Transistors (IGBT), or any suitable switching device capable of switching, preferably efficiently switching, DC power 302 at the desired frequencies. In a half wave bridge converter 310 such as that shown in the exemplary embodiment 40, switching devices Q1 and Q2 are serially coupled between the supply rail 404 and the return rail 406 and are controlled by a switch drive circuit 416. In one exemplary embodiment, the switch drive circuit 416 is a self-oscillating type that uses a transformer (not shown) to sense voltage in the resonant tank 320 to coordinate switching devices Q1 and Q2. Alternatively, switch drive circuit 416 may employ other control circuitry such as for example a microcontroller, discrete components, or other integrated circuits, to drive switching devices Q1 and Q2 such that a square wave is created at node 410. A microcontroller is a small general purpose computer typically on a single integrated circuit or small circuit board containing a processor, memory, and programmable input/output peripherals. In one embodiment, the microcontroller comprises one or more processors that are operable to coordinate switching devices Q1 and Q2. In one embodiment, the microcontroller is comprised of machine-readable instructions that are executable by a processing device. The square wave 410 excites a resonant tank 320 which acts as a filter to remove higher frequency harmonics contained in the square wave, and creates a generally sinusoidal AC power at an AC bus 306. The resonant tank 320 is arranged in a series-parallel LCC configuration comprising a resonance inductor $L_R$ and two resonance capacitors $C_{R1}$ and $C_{R2}$. Inductor $L_R$ and the two resonance capacitors $C_{R1}$ are connected in series to form the "series" portion of the "series-parallel" resonant tank configuration. The second resonance capacitor $C_{R2}$ is connected between the AC bus 306 and the return rail 406 and is coupled in parallel with the primary winding 418 of the output transformer 350 yielding the "parallel" portion of the "series-parallel" LCC resonant tank configuration. In one embodiment, the inductance $L_R$ is provided by the primary winding of a transformer allowing the secondary windings (not shown) to be used to drive a self-oscillating switch drive circuit 416. The primary winding 418 of the output transformer 350 is connected in parallel with resonant capacitor $C_{R2}$ such that the high frequency AC bus voltage 306 is applied to the primary winding 418. A blocking capacitor $C_B$ is coupled in series between the primary winding 418 of the output transformer 350 and the return rail 406. This blocking capacitor $C_B$ prevents DC current from flowing through the primary winding 418 which could cause core saturation of the output transformer 350 or other undesirable signal distortions to occur. The half-bridge converter 310 combines with the resonant tank 320 to form a resonant inverter 440 that converts the input DC voltage 302 into an AC bus voltage 306.

Power is transferred from the resonant inverter 440 to the output rectifier/filter 330 through the output transformer 350. Output transformer 350 also provides electrical isolation between the DC input power 302 and the DC output power 304 provided at the rectifier output terminals 290a and 290b. In the exemplary embodiment shown in FIG. 4 rectification is achieved by a full-wave rectifier comprising two balanced secondary windings 422, 424 on the output transformer 350 connected in opposite polarity to the output terminals 490a, 490b through a pair of output diodes $D_{O1}$ and $D_{O2}$. This arrangement provides full wave rectification using two output diodes $D_{O1}$ and $D_{O2}$. Alternatively, other rectifier configurations may be employed such as for example a single secondary winding connected to a full wave bridge rectifier or a half-wave rectifier. In alternate embodiments, active, or synchronous rectification is used. An output filter comprising capacitor $C_O$ is coupled across the output terminals 490a and 490b to filter the rectified output transformer 350 voltages and reduce harmonic components in the DC output power 304. Alternatively, other forms of low-pass output filters may be used in place of the single filter capacitor $C_O$. The negative terminal 409b of the output voltage is coupled to a second circuit ground GND2 which is electrically isolated from the first circuit common 408 tied to the return rail 406.

The resonant inverter 440 also includes a clipping circuit 470 formed by diodes D1 and D2 that are coupled between the AC bus 306 and to the supply rail 404 and return rail 206 respectively. The clipping circuit 470 constrains the AC bus voltage within the DC input voltage 302, i.e. the clipping circuit 470 prevents the AC bus voltage 306 from exceeding the supply rail 404 voltage or going below the return rail 406 voltage. Clipping diode D1 has its cathode connected to the supply rail 404 and its anode connected to the AC bus 306 thereby preventing the AC bus 306 voltage from exceeding the supply rail 404 voltage. Clipping diode D2 has its cathode connected to the AC bus 306 and its anode connected to the return rail 206, thereby preventing the AC bus 306 voltage from dipping below the voltage of the return rail 206. In the exemplary embodiment shown in FIG. 4 the return rail 206 is connected to the first circuit common 408 so that the clipping circuit 470 prevents the AC bus voltage 306 from exceeding the DC input voltage 302. The clipping circuit 470 used in resonant inverter 440 suppresses voltage spikes that could damage components in the resonant tank 320. The clipping circuit 470 also prevents the voltage applied to the primary winding 418 of the output transformer from substantially exceeding the input DC voltage 302. By suppressing voltage spikes and generally constraining the AC bus voltage, the clipping circuit 470 allows the use of components that have lower voltage ratings, such as the capacitors $C_{R1}$, $C_{R2}$, and $C_B$, thereby reducing cost of the resonant inverter 440. Further, constraining the voltage on the primary winding 418 of the output transformer 350 also effectively constrains the voltages in the secondary side of the output transformer 350 thereby controlling the voltage across the output terminals 290a and 290b. Because the clipping circuit 470 inherently constrains the voltage in the output rectifier 330 components with lower voltage ratings, such as the output diodes $D_{O1}$ $D_{O2}$, and the output capacitor $C_O$, can also be used in the output rectifier 330.

Figure 5A:
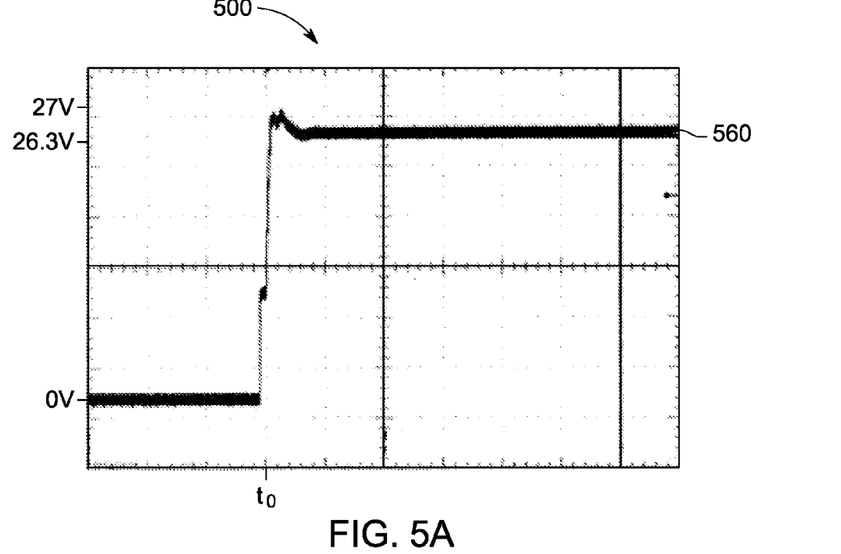
FIG. 5A illustrates a graph showing no-load startup performance of an exemplary resonant DC-DC converter incorporating aspects of the present disclosure.
Figure 5B:
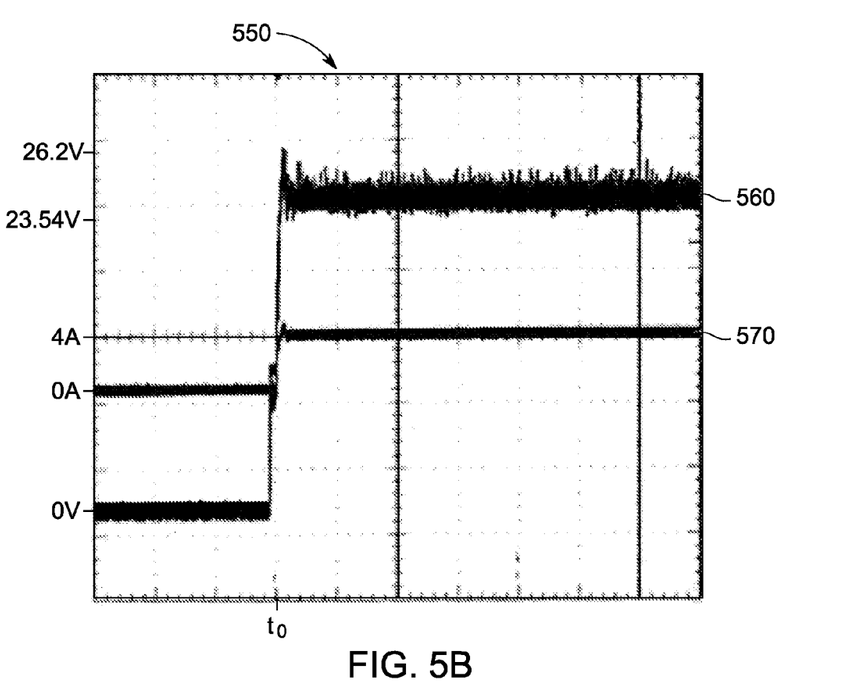
FIG. 5B illustrates a graph showing full-load startup performance of an exemplary resonant DC-DC converter incorporating aspects of the present disclosure.
Figure 6A:
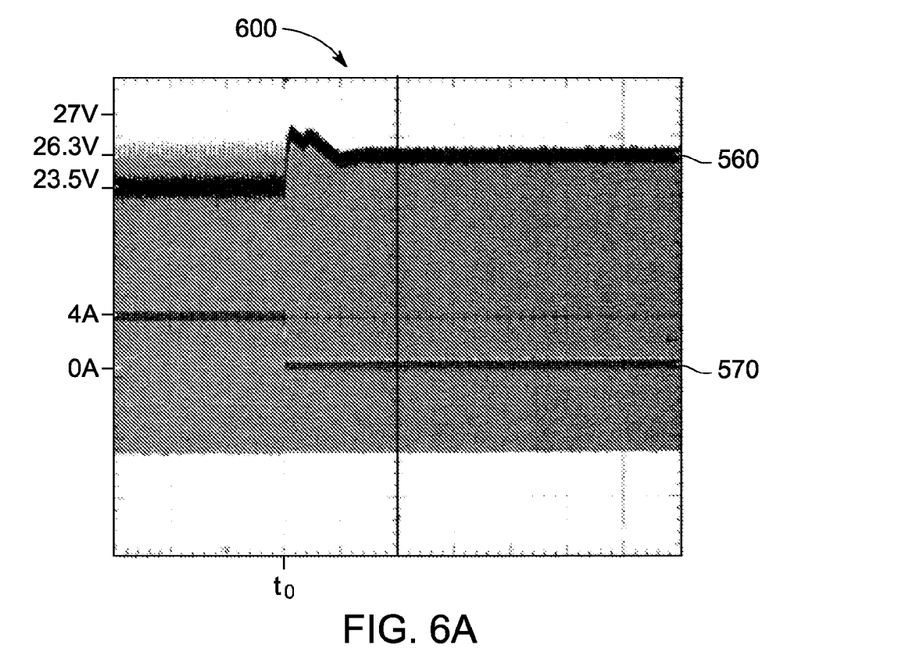
FIG. 6A illustrates a graph showing full-load to no-load transitioning performance of an exemplary resonant DC-DC converter incorporating aspects of the present disclosure.
Figure 6B:
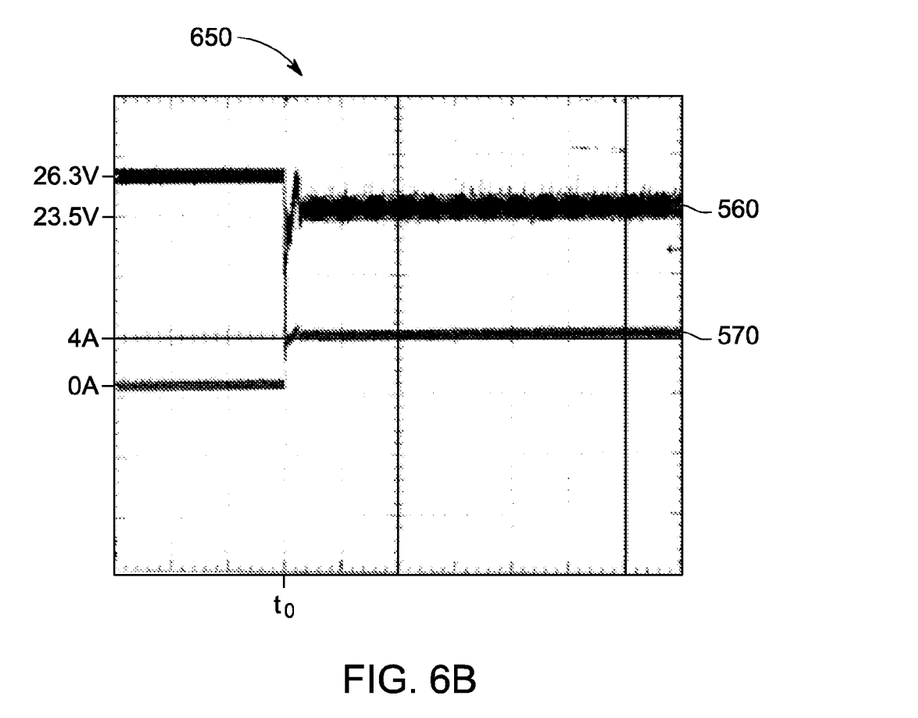
FIG. 6B illustrates a graph showing no-load to full-load transitioning performance of an exemplary resonant DC-DC converter incorporating aspects of the present disclosure.

The exemplary converter topology illustrated in FIG. 4 provides inherent over-voltage protection of the output voltage. To illustrate the OVP, an exemplary embodiment of the converter 400 illustrated in FIG. 4 was built and tested with the following components: switches Q1 and Q2 were 6N60C3 FETs; resonant tank had inductance $L_R$-1 millihenry, capacitor $C_{R1}$-8.2 nanofarad, and capacitor $C_{R2}$-470 picofarad; the blocking capacitor CB-220 nanofarad; the clamping diodes D1 and D2 were MUR160 fast rectifiers; the output transformer had a 50 to 6 turns ratio; and the output filter capacitor CO=700 microfarad. The DC input voltage 302 was set to 450 VDC. Graphs of output voltage and current versus time were captured during various extreme operating conditions. FIGS. 5A, 5B, 6A, and 6B illustrate graphs of output voltage and output current of the exemplary converter 400 described above during startup with various loading conditions. In these graphs the horizontal axis represents time while the vertical axis represents the magnitude of voltage and/or current. Referring now to the graph 500 of output voltage 560 versus time shown in FIG. 5A, the converter 400 is started at time $t_0$ with no-load, i.e. there is no load is connected to the output terminals 490a and 490b of the converter 400 and the output current is zero. Graph 500 shows the output voltage 560 is zero before the converter 400 is started, rises rapidly when the converter is started, at time $t_0$, to a peak voltage of 27 volts, then settles back to a steady state voltage of 26.3 volts. There are no voltage spikes and the overshoot is limited to 27 volts during no-load startup. Referring next to graph 550 in FIG. 5B, showing output voltage 560 and output current 570 versus time when the converter 400 is started with its full load, i.e. a load that pulls 4 amps from the output terminals 290a, 290b. Graph 550 shows the output current 570 rising rapidly when the converter is started at time $t_0$, from 0 amps to 4 amps, and the output voltage 560 rising to a peak voltage of 26.2 volts then settling back to a steady state voltage of 23.54 volts. In FIG. 6A a graph 600 of output voltage 560 versus time is shown where the load current 570 is changed from 4 amps to zero amps at time $t_0$. Graph 600 shows the output voltage 560 starts at a steady 23.5 volts prior to the load change at time $t_0$, then rises rapidly to a peak value of 27 volts when the load current 570 is changed from 4 amps to zero amps, and settles to a steady state value of 26.3 volts after the load change. FIG. 6B shows a graph 650 of output voltage 560 versus time when the load is changed from no load, i.e. zero amps, to full load, 4 amps, at time $t_0$. Graph 650 shows the output voltage 560 is at a steady state value of 26.3 volts prior to the load change at time $t_0$, and settles to a new steady state value of 23.5 volts after the load is changed from zero amps to 4 amps at time $t_0$, but does not overshoot the initial value of 26.3 volts during the load change. The exemplary embodiment has also been shown to provide adequate protection during fault conditions. For example, creating a short in the feedback control circuit, an unusually severe fault condition, caused an output voltage spike that was limited to a maximum of 27.2 volts.

Figure 7:
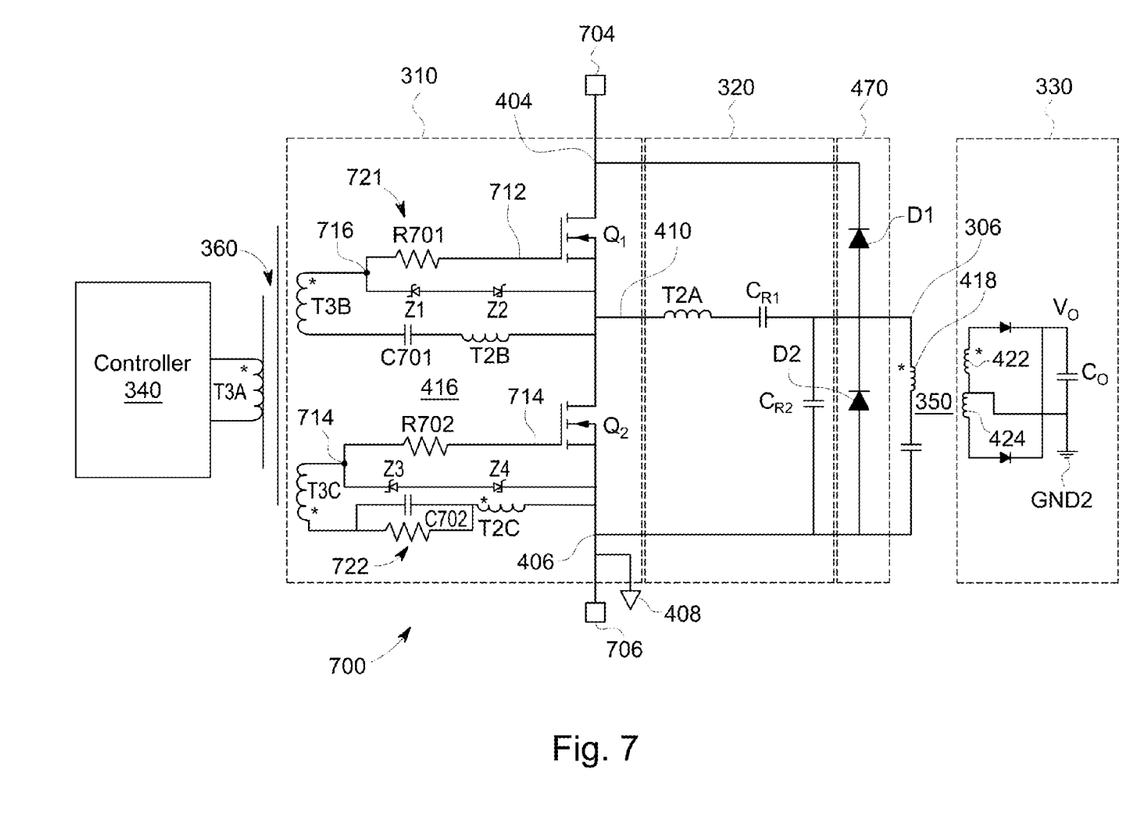
FIG. 7 illustrates a detailed schematic diagram of an exemplary resonant DC-DC converter incorporating aspects of the present disclosure.

Referring now to FIG. 7 a schematic diagram of another embodiment of a resonant converter 700 incorporating aspects of the present disclosure are shown. The exemplary resonant converter 700 shown in FIG. 7 includes electrical isolation between its input and output and may be advantageously employed in prior art supply 100 to supply power to LED arrays and provide OVP protection without the additional circuitry typically included in prior art resonant converters 130 or 200 shown in FIGS. 1 and 2. Converter 700 may also be used in any system requiring isolated DC-DC conversion with OVP. As shown in FIG. 7 the exemplary DC-DC converter 700 includes a half wave bridge converter 310 with an exemplary self-oscillating switch drive circuit 416 and configured to receive input DC power at a supply rail 404 and return rail 406 and produce a square wave output voltage at node 410. The half-bridge converter 310 provides a square wave voltage 410 to excite a resonant tank 320 which converts the square wave voltage at node 410 into a generally sinusoidal AC bus voltage 306. The bridge converter 310 includes a pair of controlled switching devices Q1 and Q2, which in the embodiment shown in FIG. 7 are n-channel MOSFETs, although any suitable switching device may be used. A DC input voltage, received at terminals 704 and 706, is selectively switched by switching devices Q1 and Q2, coupled in series between the supply rail 404 and the return rail 406, with the return rail 406 coupled to a first circuit ground GND1, wherein the selective switching of switching devices Q1 and Q2 operates to generate a square wave at an inverter or bridge converter output node 410, which in turn excites the resonant tank 320 to thereby drive the high frequency AC bus 306.

The converter 700 includes a sensing transformer, comprising first winding T2A and two secondary windings T2B and T2C, for sensing of the bridge converter output 410 and for driving self-oscillation of the bridge converter 310. A feedback transformer 360 is also included in the converter 700 to adjust the bridge converter 310 operating frequency and thereby adjust the output voltage $V_O$. An output transformer 350 is included to transfer power from the AC bus 306 to the output rectifier/filter 330. The first winding T2A of the self-oscillating transformer, which is incorporated in the resonance inductor of the resonant tank 320, along with windings T2B and T2C in switch drive control circuits 721 and 722 provide sensing and feedback of the bridge converter output voltage at node 410 for self-oscillatory operation of the bridge converter 310. During operation of the bridge converter 310, the first winding T2A of the sensing transformer acts as an inductor in the resonant tank circuit 320 while secondary windings T2B and T2C are connected in the gate drive circuits of switching devices Q1 and Q2 respectively, for oscillatory actuation of the switching devices Q1, Q2, according to voltage swings in the resonance of the tank circuit 320. Feedback transformer 360 has a first winding T3A, in the controller 340, magnetically coupled to a second and third winding T3B and T3C, which form frequency control inductances in the switch drive circuits 721 and 722, where each switch drive circuit 721, 722 includes a series combination of windings from the sensing transformer and the feedback transformer 360. The feedback transformer 360 is used by the controller 340 to selectively control the inductance of the switch drive circuits 721 and 722 and thus to control the inverter operating frequency for closed loop operation of the resonant converter 700.

The high frequency AC bus is generated at node 306 by the bridge converter 310 and the resonant tank circuit 320, which includes a resonant inductance, formed by the first winding T2A of the sensing transformer, as well as two resonant capacitors $C_{R1}$ and $C_{R2}$. The resonant tank 320 is comprised of an LCC series-parallel type resonant tank with inductance T2A connected in series with capacitors $C_{R1}$ and $C_{R2}$ to form a series resonant circuit that creates a generally sinusoidal voltage on the AC bus 306. An output transformer 350 is connected in parallel with capacitor $C_{R2}$ providing the parallel portion of the series-parallel LCC resonant tank configuration. The output transformer 350 receives AC power from the high frequency AC bus 306 and transfers it to the output rectifier 330. A blocking capacitor $C_B$ is coupled in series with the primary winding 418 of the output transformer 350 to prevent DC currents from flowing through the primary winding 418 and adversely affecting power transfer. A clipping circuit 470 is formed by diodes D1 and D2 which ties the AC bus 306 voltage to the positive supply rail 404 voltage and the return rail 406 voltage (which is tied to a first circuit ground GND1) respectively. The switches Q1 and Q2 are alternately activated to provide a square wave at bridge converter output node 410. This square wave, output by the bridge converter 310, excites the resonant tank 320 which produces a generally sinusoidal AC bus voltage 306. Power is transferred from the AC bus 306 to the output rectifier/filter 330 through the secondary side of the output transformer 350, i.e. secondary windings 422 and 424. Similar to the topology described above, two balanced secondary windings 422, 424 on the output transformer 350 are connected in opposite polarity to the DC output voltage $V_O$ through a pair of output diodes $D_{O1}$ and $D_{O2}$, thereby providing full-wave rectification of the AC bus voltage 306 after transfer to the secondary side of the output transformer 350. The rectified power is smoothed and filtered by an output capacitor $C_O$ producing the DC output $V_O$. Again, it should be noted that alternate rectifier configurations may be substituted without straying from the spirit and scope of the present disclosure.

The switch gating signals 712, 714 are generated using the drive circuits 721 and 722, with the first drive circuit 721 coupled between the inverter output node 410 and a first circuit node 716, and the second drive circuit 722 coupled between the circuit ground GND1 and second circuit node 718. The drive circuits 721 and 722 include the first and second driving inductors T2B and T2C of the sensing transformer, which are secondary windings mutually coupled to the resonant inductor T2A of the resonant tank circuit 320 to induce voltage in the driving inductors T2B and T2C proportional to the instantaneous rate of change of current in the resonant tank circuit 320 for self-oscillatory operation of the inverter 310. In addition, the drive circuits 721 and 722 include the frequency control inductors, formed by windings T3B and T3C of the feedback transformer, serially connected to the respective first and second driving inductors T2B and T2C and through resistors R701 and R702 respectively, to the gate control lines 712 and 714. A capacitor C701 is connected in series between the sensing transformer winding T2B and feedback transformer winding T3B to aid the oscillatory behavior of gate drive circuit 721. Similarly a capacitor C702 is connected in series between the sensing transformer winding T2C and feedback transformer winding T3C in the gate drive circuit 722. The windings T3B and T3C of the feedback transformer 360 operate as frequency control inductances for the controller 340. The feedback transformer has a tertiary control winding T3A coupled to the controller 340 by which the controller 340 can change the oscillatory frequency of the inverter 310 by varying the inductance of the frequency control windings T3B and T3C through control of the loading on tertiary control winding T3A.

In operation, the gate drive circuits 721 and 722 maintain switching device Q1 in an "ON" state for a first half of a cycle and the switching device Q2 in an "ON" state for a second half of the cycle to generate a generally square wave at the bridge converter output node 410 for excitation of the resonant tank circuit 320. The gate to source voltages of the switching devices Q1 and Q2 in one embodiment are limited by bi-directional voltage clamps Z1, Z2 and Z3, Z4 (e.g., back-to-back Zener diodes) coupled between the respective switch sources and the gate control circuit nodes 716 and 718. In the exemplary embodiment shown, the individual bi-directional voltage clamps Z1, Z2 and Z3, Z4 cooperate with the respective frequency control inductors T3B and T3C to control the phase angle between the fundamental frequency component of voltage across the resonant circuit 320 and the AC current in the resonant inductor T2A.

In steady state operation of the half wave bridge converter 310 and resonant tank 320, the square wave voltage at the bridge converter output node 410 begins a cycle with a voltage equal to the positive rail 504 voltage, and the initial bias voltage across C701 drops. In the exemplary bridge converter 310, a first network including the capacitor C101 and inductor T3B, and a second network including the capacitor C702 and inductor T3C, are equivalently inductive with an operating frequency above their resonant frequency. In steady state oscillatory operation, this results in a phase shift of the gate circuit to allow the current flowing through the inductor T2A to lag the fundamental frequency of the voltage produced at the bridge converter output node 410, thus facilitating steady-state soft-switching of the bridge converter 310. The AC bus voltage 306 produced by the resonant tank circuit 320, in the exemplary embodiment shown, is clipped by the serially connected clipping diodes D1 and D2 to limit the voltage seen by the resonant circuit capacitor CR2 and the primary winding of the output transformer 350. As the resonant inverter output voltage 306 increases, the clipping diodes D1, D2 start to clip the AC bus voltage 306, preventing the voltage across the capacitor C and the parallel connected primary winding of the output transformer 350 from changing sign and limiting the output voltage to a value that prevents thermal damage to components of the resonant converter 700.

In the exemplary resonant converter 700, illustrated in FIG. 7, the nominal operating frequency of the bridge converter 310 is above the resonant frequency of the resonant tank 320. Thus a decrease of the operating frequency of the bridge converter 310 moves the operating frequency closer to the resonant frequency of the tank circuit 320, thereby reducing the impedance of the resonant tank 320 and increasing the AC bus voltage 306. Similarly, an increase in the operating frequency of the bridge converter 310 results in increased impedance of the resonant tank circuit 320 and a reduction of the AC bus voltage 306. Further, decreased loading of frequency control inductor T3A causes a decrease of the bridge converter 310 operating frequency. Thus, the controller 340 increases or decreases the loading of the frequency control winding T3A to reduce or raise AC bus voltage 306 which in turn raises or lowers the output voltage $V_O$ of the output rectifier/filter 330.

In steady state operation, therefore, the bridge converter 310 and resonant tank 320 provide a high frequency AC bus voltage 306, while maintaining the soft switching condition for switching devices Q1 and Q2. The high frequency current flowing through the primary winding 418 of the output transformer 350 is magnetically coupled to the secondary windings 422 and 424 which drive a full-wave rectifier formed by diodes $D_{O1}$ and $D_{O2}$ in the output rectifier/filter 330. As was noted before, other forms of rectification may also be employed in the output rectifier 330. The exemplary output rectifier/filter 330 shown in FIG. 7 includes an output filter comprising a capacitor $C_O$ that operates to reduce harmonics and smooth the rectified DC voltage produced by diodes $D_{O1}$ and $D_{O2}$, resulting in a generally steady DC output voltage $V_O$ from the exemplary resonant converter shown in FIG. 7.

The controller 340 operates to maintain a generally constant output voltage $V_O$ by adjusting the frequency of the half bridge converter 310. An exemplary embodiment of a controller 340 operable to adjust the frequency of the half bridge converter 310 is shown in more detail in FIG. 8. In alternate embodiments, the controller 340 comprises one or more processors that are operable to adjust the frequency of the half bridge converter 310. In one embodiment, the controller 340 is comprised of machine-readable instructions that are executable by a processing device.

Figure 8:
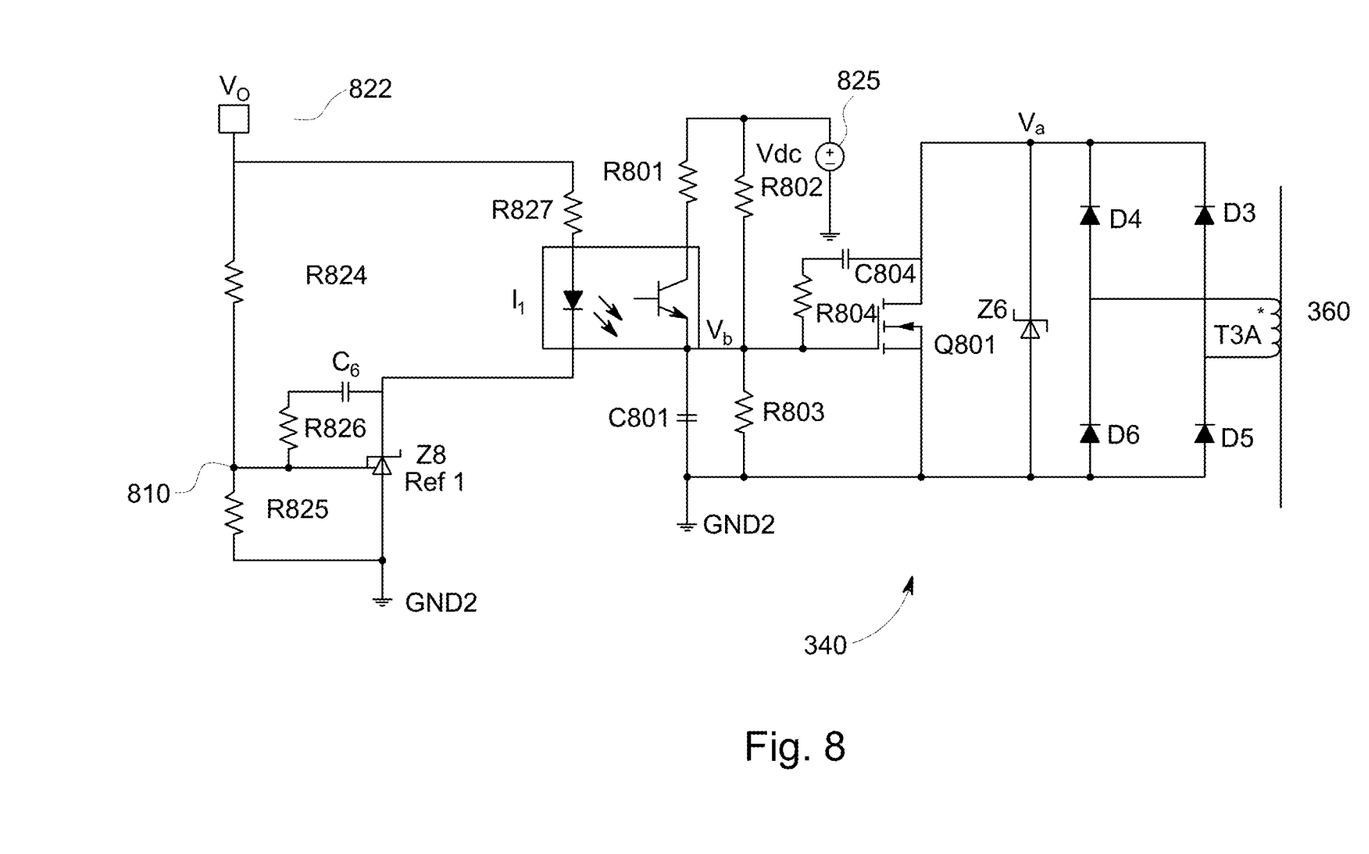
FIG. 8 illustrates a detailed schematic diagram of a regulator for controlling a resonant DC-DC converter incorporating aspects of the present disclosure.

Referring now to FIG. 8, the controller 340 receives the DC output voltage $V_O$ produced by the output rectifier 330 of resonant converter 700 at terminal 822 and uses a resistor divider network, comprised of resistors R824 and R825 series connected between $V_O$ and the output ground GND2, to create a feedback voltage at node 810. This feedback voltage at node 810 is used to drive a shunt reference REF1. In one embodiment shunt reference REF1 is a programmable reference such as for example a precision programmable reference TL431. Those skilled in the art will recognize that other references may also be used. Feedback compensation for stability and output response of the resonant converter 700 are provided by resistor R826 and capacitor C6 series connected between a reference input and cathode of the shunt reference REF1. An opto-isolator I1 electrically isolates the control circuit from the DC output voltage $V_O$. The cathode of the opto-isolator's I1 source LED is connected to the output voltage $V_O$ of the converter 200 through a series connected resistor R827 while the anode of the source LED of the opto-isolator I1 is tied to the anode of the shunt reference REF1. The feedback voltage 810 drives the shunt reference REF1 which in turn controls output of the opto-isolator I1 The opto-isolator operates to vary/control the inductance of the bridge converter windings T3B and T3C of the feedback transformer 360, by adjusting the loading seen by the tertiary winding T3A, which in turn changes the operating frequency of the bridge converter 310 of FIG. 7. In particular, as the frequency of the bridge converter 310 is decreased, the DC output voltage $V_O$ will increase and vise-versa. The bridge converter 310 frequency decreases with decreased loading of tertiary winding T3A. Thus, the exemplary controller 340 of FIG. 8 operates to increase or decrease the loading on tertiary winding T3A to reduce or raise the DC output voltage $V_O$ respectively. The exemplary controller 340 includes a MOSFFET Q801 to control the loading of a full wave bridge rectifier comprised of diodes D3-D6 with a zener diode Z6 coupled across its upper and lower terminals. MOSFET Q801 is also coupled across the upper and lower terminals of the bridge rectifier D3-D6 while the AC terminals of the bridge rectifier D3-D6 are coupled to the tertiary winding T3A of the feedback transformer 360. The gate of MOSFET Q801 is biased through resistors R802 and R803 from a DC voltage source 825 and stabilized by resistor R804 and capacitor C804 connected in series to the source of MOSFET Q801 and a capacitor C601 which is connected to circuit ground GND2. The output of the opto-isolator I1 receives drive power from the DC voltage source 825 through resistor R801 and drives the gate of MOSFET Q601 thereby controlling the loading on the tertiary winding T3A of the feedback transformer 360 which acts to adjust the frequency of the bridge converter 310 as discussed above.

The feedback control provided by controller 340 operates to reduce any difference between an established reference level and the DC output voltage $V_O$. In general, the controller 340 increases the loading, by increasing the gate signal on MOSFET Q801, to decrease the inductance of the transformer windings T3B and T3C, thereby increasing the bridge converter frequency and thus decreasing the DC output voltage $V_O$ when the sensed output voltage 810 is above the reference level and vise-versa when the sensed output voltage 810 is below the reference level. The exemplary controller 340 illustrated in FIG. 8 shows one embodiment of a controller 340 that may be used to control the output voltage $V_O$ of the converter 700, alternatively, other embodiments are possible in which the loading of the tertiary winding T3A is modified to control the DC output voltage $V_O$ of the output rectifier 330. The resonant converter 700 thus provides electrical isolation between resonant inverter input 704, 706 and the DC output $V_O$ of the output rectifier 330 using the output transformer 350 to isolate the forward power transfer path, and using the feedback transformer 360 to isolate the feedback path. In the exemplary controller 340 shown in FIG. 8, additional electrical isolation is provided by the opto-isolator I1.

Figure 9A:
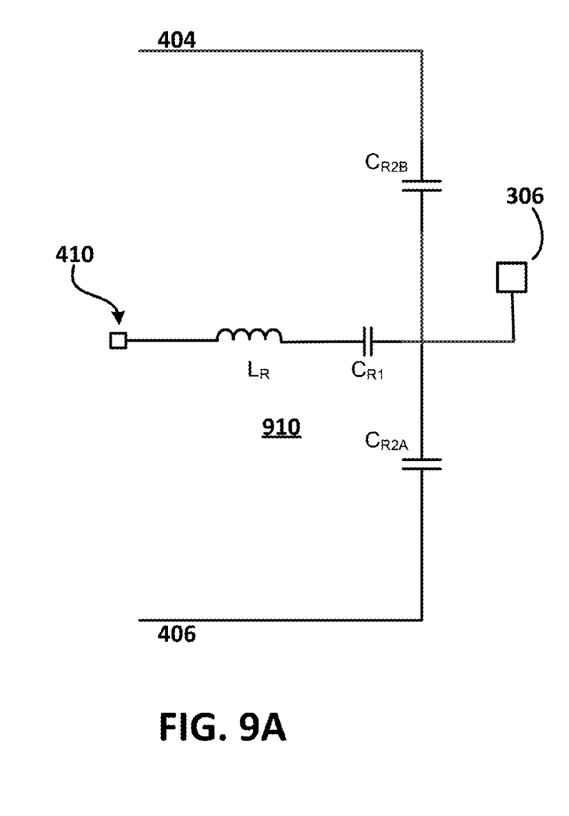
FIG. 9A illustrates a schematic diagram of a resonant tank circuit incorporating aspects of the present disclosure.
Figure 9B:
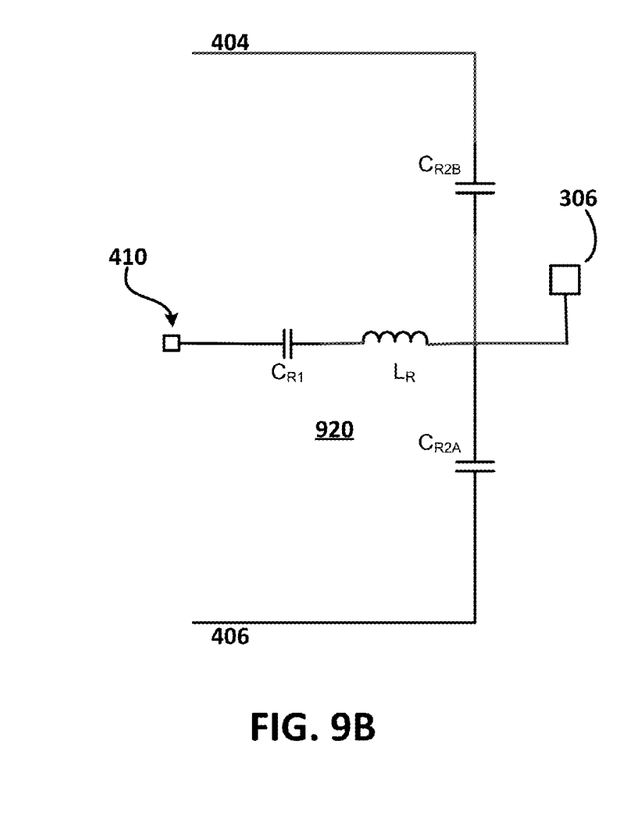
FIG. 9B illustrates a schematic diagram of a resonant tank circuit incorporating aspects of the present disclosure.

The exemplary embodiments described above comprise a series-parallel LCC resonant tank 320 with the load, formed by the output transformer 350, coupled in parallel with the second resonant capacitor $C_{R2}$. Alternate embodiments use other resonant tank configurations, such as for example the configurations illustrated in the schematic diagrams shown in FIGS. 9A and 9B. The resonant tank 910 in FIG. 9A comprises a series-parallel LCC configuration similar to the resonant tank 320 described above, with a resonance inductor $L_R$ coupled to the half bridge converter square wave output 410 and a first and second resonance capacitor $C_{R1}$, $C_{R2A}$ coupled in series between the resonance inductor $L_R$ and the return rail 406. The resonant tank 910 includes an additional resonance capacitor $C_{R2B}$ coupled between the high frequency AC bus 306 and the supply rail 404. This additional resonant capacitor $C_{R2B}$ acts in parallel with the second resonant capacitor $C_{R2A}$ to form an equivalent second resonance capacitance with a value equal to the sum $C_{R2A}+C_{R2B}$. The load, which in the embodiments described above is formed by the output transformer 350 and blocking capacitor $C_B$, is coupled in parallel to the lower capacitor $C_{R2A}$. Alternatively, the load may be coupled in parallel to the upper capacitor $C_{R2B}$. FIG. 9B shows a schematic diagram illustrating a series-parallel CLC resonant tank embodiment 920 that has the first resonant capacitor $C_{R1}$ coupled directly to the half bridge converter square wave output 410 with the resonance inductor $L_R$ and second resonance capacitor $C_{R2A}$ coupled in series between the first capacitor $C_{R1}$ and the return rail 406, with an additional capacitor $C_{R2B}$ coupled between the AC bus 306 and return rail 406. As described above the additional capacitor $C_{R2B}$ acts in parallel with the capacitor $C_{R2A}$ to form the second resonance capacitance of the CLC resonant tank. With the series-parallel CLC resonant tank configuration 920 the load may be coupled in parallel with either capacitor $C_{R2A}$ or $C_{R2B}$. As described above the clipping circuit 470 is coupled to the AC bus 306 and each of the supply 404 and return 406 rails to constrain the AC bus 306 voltage between the voltages of the supply 404 and return 406 rails. One skilled in the art will recognize that other resonant tank configurations may be used without straying from the spirit and scope of the present disclosure.

Figure 10:
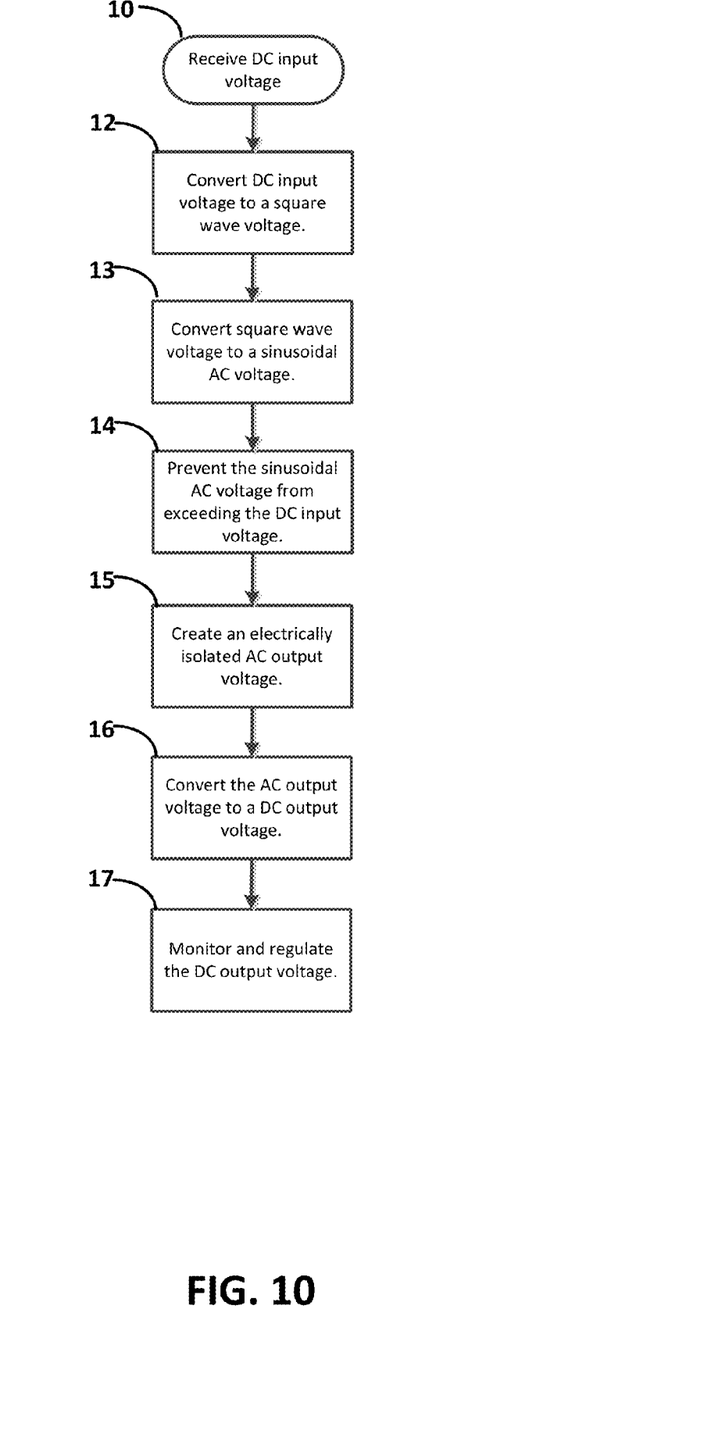
FIG. 10 illustrates a flowchart for one embodiment of a method for providing over-voltage protection in a resonant switch mode DC to DC converter incorporating aspects of the present disclosure.

FIG. 10 illustrates a flowchart for one embodiment of a method for providing over-voltage protection in a resonant switch mode DC to DC converter. The method begins by receiving 10 an initial DC input voltage that is to be converted. The DC input voltage is then converted 12 to a square wave voltage using a bridge converter. The converter used to create the square wave voltage can be a full-bridge converter comprised of four switching devices or preferably a half-bridge converter 310 which uses only two switching devices. The square wave voltage is then converted 13 to a generally sinusoidal AC voltage using a series-parallel LCC resonant tank circuit 320 as shown in FIG. 4. Alternatively, the generally sinusoidal AC voltage can be created using one of the alternate resonant tank configurations 910 and 920 as shown in FIGS. 9A and 9B. The generally sinusoidal AC voltage is prevented 14 from substantially exceeding the DC input voltage using a clipping circuit such as the clipping circuit 470 shown in FIG. 4. An electrically isolated AC output voltage is created 15 from the generally sinusoidal AC voltage. As described above the generally sinusoidal AC output voltage created by a series-parallel LCC resonant tank circuit is the voltage seen by a device connected in parallel with the second resonant capacitor C shown in FIG. 4, or alternatively connected in parallel with capacitor $C_{R2A}$ shown in FIGS. 9A and 9B. The AC output voltage is converted 16 to a DC output voltage using a full wave rectifier and an output filter, such as the full wave rectifier and output filter 330 shown in FIG. 4. In many situations it is important to maintain the DC output voltage at a generally constant value within tight tolerances. To achieve this, some embodiments include an additional step 17 of monitoring and regulating the DC output voltage. In certain embodiments this regulation is accomplished by adjusting the frequency of the half-bridge converter used to produce the square wave voltage as was discussed above in connection with FIG. 8.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A resonant DC-DC converter, comprising:
   a half-bridge converter configured to receive DC input power and produce a square wave voltage,
   a resonant tank circuit comprising an inductive element, a first resonance capacitor, and a second resonance capacitor, wherein the resonant tank circuit is coupled to the half-bridge converter to receive the square wave voltage such that a generally sinusoidal AC voltage is produced across the second resonance capacitor,
   an output transformer having a primary winding and one or more secondary windings, the primary winding coupled in parallel to the second resonance capacitor,
   a clipping circuit coupled on an output side of the resonant tank circuit to the primary winding such that a voltage across the primary winding does not substantially exceed a voltage of the DC input power, and
   an output rectifier coupled to the one or more secondary windings and configured to produce a generally DC output voltage.

2. The resonant DC-DC converter of claim 1, wherein the clipping circuit comprises a first diode coupled between the primary winding and a supply of the DC input power, and a second diode coupled between the primary winding and a return of the DC input power.

3. The resonant DC-DC converter of claim 1, wherein the output rectifier comprises an output filter capacitor, and two output diodes,
   wherein the one or more secondary windings comprises two windings each coupled in opposite polarity to a respective one of the two output diodes such that a full-wave rectified output voltage is produced, and
   wherein the output filter capacitor is coupled across the full-wave rectified output voltage to produce the generally DC output voltage.

4. The resonant DC-DC converter of claim 1, wherein the half bridge converter further comprises a self-oscillating switch drive circuit magnetically coupled to the inductive element.

5. The resonant DC-DC converter of clam 4, further comprising a controller, wherein the controller is coupled to the DC output voltage and magnetically coupled to the switch drive circuit, such that the controller is operable to adjust the frequency of the switch drive circuit based at least in part on the DC output voltage.

6. The resonant DC-DC converter of claim 1, wherein a blocking capacitor is coupled in series with the primary winding.

7. The resonant DC-DC converter of claim 2, wherein the resonant tank circuit further comprises a third resonance capacitor coupled between the supply and the second resonance capacitor.

8. The resonant DC-DC converter of claim 7, wherein the primary winding is coupled in parallel with the third resonance capacitor.

9. The resonant DC-DC converter of claim 1, wherein the first resonance capacitor is coupled in series with the inductive element which is coupled in series with the second resonance capacitor.

10. The resonant DC-DC converter of claim 1, wherein the inductive element is coupled in series with the first capacitor which is coupled in series with the second capacitor.

11. A method for providing over-voltage protection in a resonant switch mode DC to DC converter, the method comprising:
converting a DC input voltage, having a supply and a return, to a square wave using a half-bridge converter;
converting the square wave to a generally sinusoidal AC bus voltage using a series-parallel LCC resonant tank circuit;
preventing the generally sinusoidal AC bus voltage from substantially exceeding the DC input voltage using a clipping circuit on an output side of the resonant tank circuit;
creating and electrically isolating an AC output voltage from the AC bus voltage via an output transformer; and
converting the AC output voltage to a DC output voltage using a rectifier and an output filter.

12. The method of claim 11, further comprising regulating the output voltage at a generally constant value by adjusting the frequency of the half-bridge converter based at least in part on a measurement of the DC output voltage.

13. A power source for an LED array, the power source comprising:
an input rectifier configured to receive an input AC power and produce an initial DC voltage;
a boost regulator configured to receive the initial DC voltage and produce an intermediate DC voltage wherein the intermediate DC voltage is greater than the initial DC voltage;
a half-bridge converter configured to receive the intermediate DC voltage and produce a square wave voltage,
a resonant tank circuit comprising an inductive element, a first resonance capacitor, and a second resonance capacitor, wherein the resonant tank circuit is coupled to the half-bridge converter to receive the square wave voltage such that a generally sinusoidal AC voltage is produced across the second resonance capacitor,
an output transformer having a primary winding and one or more secondary windings, the primary winding coupled in parallel to the second resonance capacitor,
a clipping circuit coupled on an output side of the resonant tank circuit to the primary winding such that a voltage across the primary winding does not substantially exceed the intermediate DC voltage, and
an output rectifier coupled to the one or more secondary windings and configured to produce a generally DC output voltage.

14. The power source of claim 13, wherein the clipping circuit comprises a first diode coupled between the primary winding and a supply of the intermediate DC voltage, and a second diode coupled between the primary winding and a return of the intermediate DC voltage.

15. The power source of claim 13, wherein the output rectifier comprises an output filter capacitor, and two output diodes,
wherein the one or more secondary windings comprises two windings each coupled in opposite polarity to a respective one of the two output diodes such that a full-wave rectified output voltage is produced, and
wherein the output filter capacitor is coupled across the full-wave rectified output voltage to produce the generally DC output voltage.

16. The power source of claim 13, wherein the half bridge converter further comprises a self-oscillating switch drive circuit magnetically coupled to the inductive element.

17. The power source of clam 16, further comprising a controller, wherein the controller is coupled to the DC output voltage and magnetically coupled to the switch drive circuit, such that the controller is operable to adjust the frequency of the switch drive circuit based at least in part on the DC output voltage.

18. The power source of claim 13, wherein a blocking capacitor is coupled in series with the primary winding.

19. The power source of claim 13, wherein the half-bridge converter comprises two switches serially connected between a supply and a return of the intermediate DC voltage, and a microcontroller coupled to the two switches and configured to alternately turn each of the switches on and off such that the square wave voltage is produced at a circuit node between the two switches.

20. The power source of claim 19, wherein the microcontroller is coupled to a feedback voltage wherein the feedback voltage is proportional to the DC output voltage, and
wherein the microcontroller is further configured to adjust the frequency of the square wave voltage based at least in part on the feedback voltage.

* * * * *